(12) United States Patent
Seo et al.

(10) Patent No.: US 6,946,993 B2
(45) Date of Patent: Sep. 20, 2005

(54) DIGITAL BROADCASTING SERVICE RECEIVER FOR IMPROVING RECEPTION ABILITY BY SWITCHED BEAM-FORMING

(75) Inventors: Jae Hyun Seo, Daegu (KR); Jae Hwui Bae, Daejon (KR); Seung Won Kim, Daejon (KR); Chieteuk Ahn, Daejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 10/633,160

(22) Filed: Jul. 31, 2003

(65) Prior Publication Data

US 2004/0061645 A1 Apr. 1, 2004

(30) Foreign Application Priority Data

Sep. 27, 2002 (KR) .................... 10-2002-0058989

(51) Int. Cl.⁷ .................... H01Q 3/24; H04B 17/02
(52) U.S. Cl. .................... 342/374; 455/133; 455/277.1
(58) Field of Search .................... 342/372–374, 342/377; 455/133–136, 277.1, 277.2; 348/726–727

(56) References Cited

U.S. PATENT DOCUMENTS

| 6,018,316 A | * | 1/2000 | Rudish et al. ............... 342/368 |
| 6,018,317 A | * | 1/2000 | Dogan et al. ............... 342/378 |
| 6,377,783 B1 | * | 4/2002 | Lo et al. ............... 342/374 |
| 6,442,405 B1 | * | 8/2002 | Hiramatsu et al. ........ 455/277.1 |
| 6,509,865 B2 | * | 1/2003 | Takai ............... 342/372 |
| 2004/0038714 A1 | * | 2/2004 | Rhodes et al. ............ 455/562.1 |
| 2004/0120285 A1 | * | 6/2004 | Paila et al. ............ 370/331 |
| 2004/0160361 A1 | * | 8/2004 | Izzat et al. ............ 342/360 |

FOREIGN PATENT DOCUMENTS

| KR | 2001-582 | 1/2001 | |
| KR | 2002024876 A | * 4/2002 | ............ H01Q/3/38 |
| KR | 1020020037965 A | 5/2002 | |
| KR | 2002-49358 | 6/2002 | |
| WO | WO 99/34272 | 7/1999 | |
| WO | WO 01/19075 A2 | 3/2001 | |
| WO | WO 01/67633 | 9/2001 | |

OTHER PUBLICATIONS

English translation of KR 1020020037965 A.*
P. Lehne et al., An Overview of Smart Antenna Technology for Mobile Communications Systems, IEEE Communications Surveys, vol. 2(4), pp. 2–13, 1999.*
English Translation of KR 2002024876 A.*
A. Chelouah et al., Angular diversity based on beam switching of circular arrays for HIPERLAN terminals, Electronics Letters, vol. 36(5), pp. 387–388, Mar. 2000.*
F. Benhamida et al., The capacity enhancement of the DCS network by the use of switch–beam antennas, IEEE International Conference on Universal Personal Communications, vol. 1, pp. 463–467, Sep.–Oct. 1996.*
English Translation of KR 20010000582 A.*

* cited by examiner

Primary Examiner—Thomas H. Tarcza
Assistant Examiner—Fred H. Mull
(74) Attorney, Agent, or Firm—Blakely Sokoloff Taylor & Zafman

(57) ABSTRACT

A receiver for improving reception ability of digital broadcasting service by switched beam-forming is disclosed. The receiver includes: an array antenna having a plurality of antenna elements for receiving signals of the digital broadcasting service; a demodulation unit for demodulating the receiving signals corresponding to each of antenna elements in the array antenna; beam-forming unit for generating a predetermined number of beam-forming signal by applying a beam-forming weights in order to direct to a predetermined direction according to the modulated signal from the modulation unit; and beam selection unit for selectively receiving signals of desired direction according to the beam forming signal. The present invention effectively eliminates multipath based on space filtering by utilizing beam-forming method with an array antenna for improving receiving performance of digital television broadcasting with VSB.

7 Claims, 5 Drawing Sheets

CASE OF RECEIVING SIGNAL BY USING ALL-DIRECTIONS ANTENNA

CASE OF RECEIVING SIGNAL BY USING BEAM PATTERN 2

DIGITAL BROADCASTING SERVICE RECEIVER FOR IMPROVING RECEPTION ABILITY BY SWITCHED BEAM-FORMING

FIELD OF THE INVENTION

The present invention relates to a receiver for digital broadcasting service; and, more particularly, to a receiver for improving reception ability of digital broadcasting service by switched beam-forming.

DESCRIPTION OF RELATED ARTS

A signal of digital broadcasting service contains various formats of data such as video, audio or computer data and is transmitted to a user. The signal of the digital broadcasting transmitter is affected by characteristics of channel such as multipath, a Doppler frequency, and active channel of mobile receiving environment. The digital television broadcasting service is more easily affected by the characteristics of channel compared with the analogue television broadcasting service. That is, in the analogue television broadcasting service, an affection of the characteristics of channel degrades a picture quality, however, in the digital television broadcasting service, the signal affected by the characteristics of channel may not be decoded.

Specially, a vestigial side band (VSB) transmitting method uses a channel equalizer for compensating interference between multipaths of channel. However, the channel equalizer could not sufficiently compensate the interference especially in a mobile receiving channel.

Generally, a mobile channel has Rayleigh fading channel characteristic and frequency selective low speed fading variable channel characteristic. In a poor Rayleigh fading channel, the channel equalizer of a VSB digital television DTV transmission system cannot perfectly perform to trace variable channel characteristic and to detect main path signal, therefore, the channel equalizer produces an error of detecting and tracing in output signal.

The errors mentioned above are distinguished from an ambient noise of transmission channel and they increase a threshold of visibility, which is a minimum signal to noise ratio for recovering to original signal of DTV. Therefore, the channel equalizer performance needs to be improved for providing normal service in mobile channel of VSB transmission system having TOV of 15 decibel (dB).

In a conventional VSB transmission system, a channel equalizer utilizes algorithm such as a least mean square LMS, a recursive lest square and kalman for eliminating an interference of active multipath by signal processing of time region.

However, in case of the poor Raleigh fading channel such as the mobile channel, reception ability is decreased since the channel equalizer cannot sufficiently compensate interference.

SUMMARY OF THE INVENTION

It is, therefore, an object of the present invention to provide a receiver for improving reception ability of digital broadcasting service by switched beam-forming.

In accordance with an aspect of the present invention, there is provided an apparatus for receiving a signal of digital broadcasting service including: an array antenna having a plurality of antenna elements for receiving signals of the digital broadcasting service; demodulation unit for demodulating the receiving signals corresponding to each of antenna elements in the array antenna; beam-forming unit for generating a predetermined number of beam-forming signal by applying a beam-forming weights in order to direct to a predetermined direction according to the modulated signal from the modulation unit; and beam selection unit for selectively receiving signals of desired direction according to the beam forming signal.

In accordance with an aspect of the present invention, there is also provided an apparatus for receiving a signal of digital broadcasting service including: switched beamforming unit for generating a beamformed signal in order to steer the beam to a predetermined number of angle by applying a beam-forming weight to received signal of digital broadcasting service and selectively receiving a signal of desired direction.

BRIEF DESCRIPTION OF THE DRAWING(S)

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
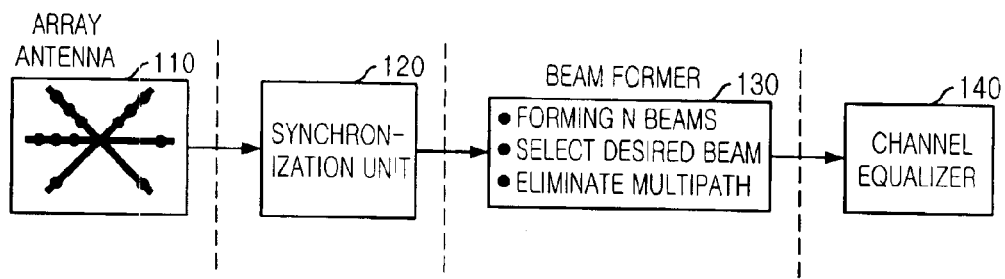
FIG. 1 is a diagram illustrating a receiver of a digital television (DTV) broadcasting signal using a switched beam-forming in accordance with the preferred embodiment of the present invention.

FIG. 1 is a diagram illustrating a receiver of a digital television (DTV) broadcasting signal using a switched beam-forming in accordance with the preferred embodiment of the present invention. Referring to FIG. 1, the receiver includes a DTV array antenna 110, a synchronizer 120, a beam former 130 and a channel equalizer 140.

The DTV array antenna 110 receives a signal of the digital television broadcasting signal and passes the received digital television broadcasting signal to the beam former 130 through the synchronizer 120. The beam former 130 improves channel characteristics of the signal and the signal having improved channel characteristics is passed to the channel equalizer 140.

By improving the channel characteristics of the signal before inputting to the equalization, the user can have better picture quality.

Figure 2:
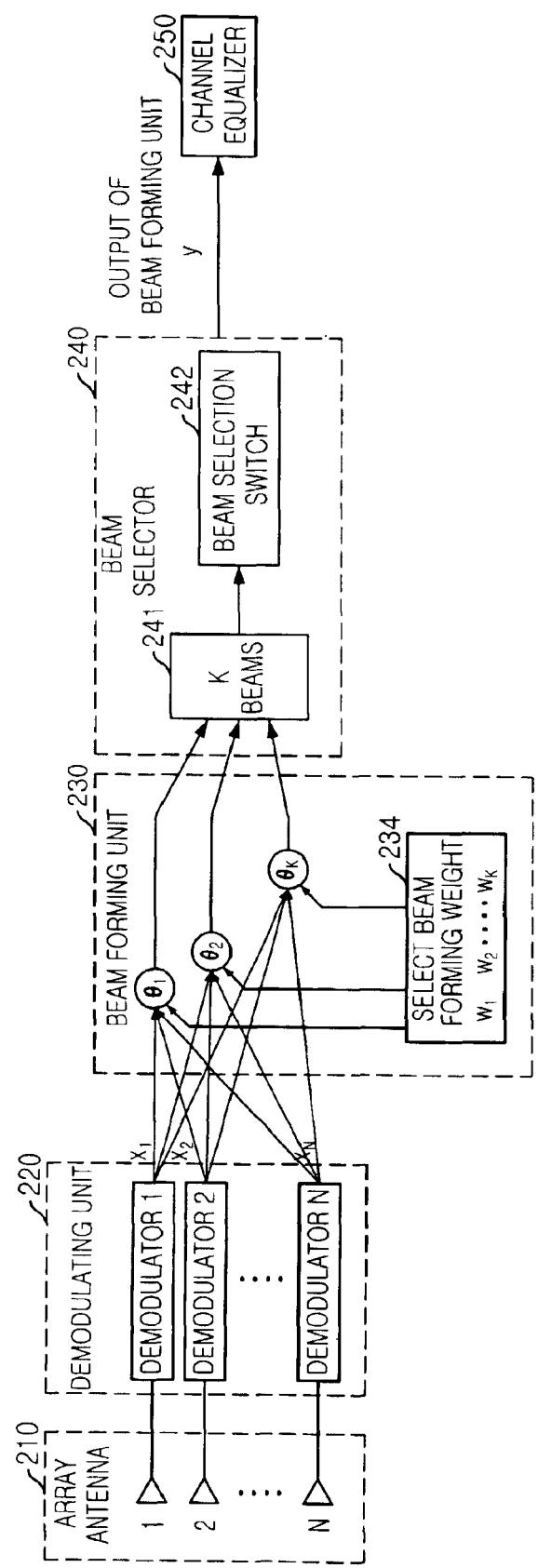
FIG. 2 is a detailed diagram showing a receiver of digital broadcasting service in accordance with the present invention.

FIG. 2 is a detailed diagram showing a receiver of digital broadcasting service in accordance with the present invention.

Referring to FIG. 2, the receiver includes an array antenna 210, a demodulating unit 220, a beam-forming unit 230, a beam selector 240 and a channel equalizer 250.

The array antenna receives signals of digital television broadcasting service. If the array antenna has N integer number of antenna elements, the received signal can be expressed by a delay time (td), which is caused by a distance between antenna elements. It is expressed as following equation 1.

$$t_d = \frac{2\pi D}{\lambda} \sin\theta \qquad \text{Eq. 1}$$

In Eq. 1, D is a distance between antenna elements, θ incidence angle of a path and λ is a wavelength of a signal.

Figure 3:
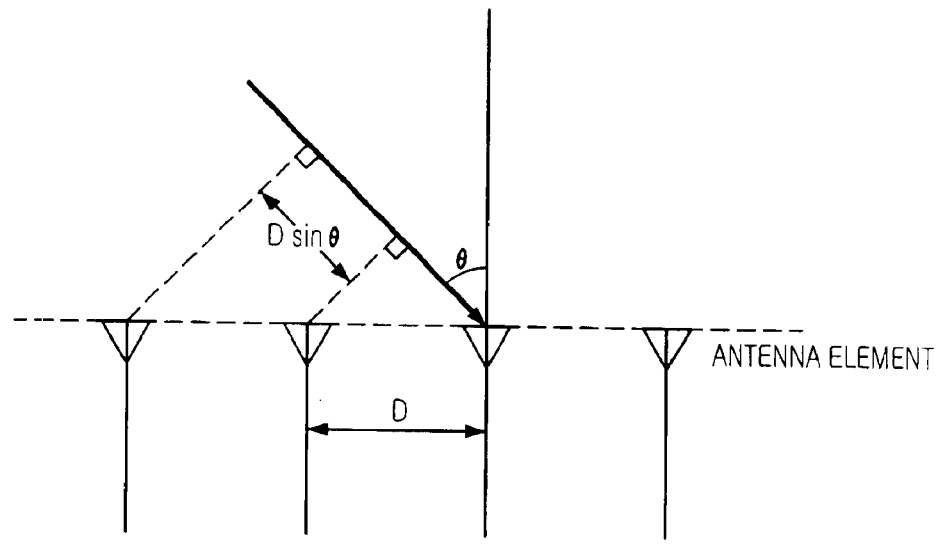
FIG. 3 is a view depicting a relationship between a signal of digital broadcasting service and antenna elements of array antenna in accordance with a preferred embodiment of the present invention.

FIG. 3 is a view depicting a relationship between a signal of digital broadcasting service and antenna elements of array antenna in accordance with a preferred embodiment of the present invention. FIG. 3 also represents graphical view of Eq. 1.

The array antenna 210 of FIG. 2 requires M×N demodulators when the array antenna is M axis of linear arrays and there are N antenna elements in each of M axis of linear arrays, wherein M and N is integer number. In other hand, the array antenna 210 requires N demodulators when the array antenna is a circular array with N antenna elements or a planar array.

An output signal of the demodulator 220 is an input signal of the beam former 230 and the input signal is expressed as x1, x2, . . . , xN. For switched beam-forming, beam-forming weights w1, w2, . . . , wN are applied by considering a steering vector forming N beams.

At first, input signals x1, x2, . . . , xN are converted to K number of beams to direct to a predetermined direction by applying the beam-forming weights. That is, the input signals X1, X2, . . . , XN and the beam-forming weights w1, w2, . . . , wK are multiplied and passed through adders 231 to 233 for building a beam-forming signal directing K number of azimuth.

The beam selector 240 selects one beam directing to a direction for receiving desired signal among K beams and dumps signals received from remained K−1 beams. By selecting one beam of desired direction, receiving signals from undesired azimuths are eliminated. As a result, characteristic of channel is improved. After eliminating, a signal y of the selected beam is inputted to the channel equalizer 250.

Figure 4A:
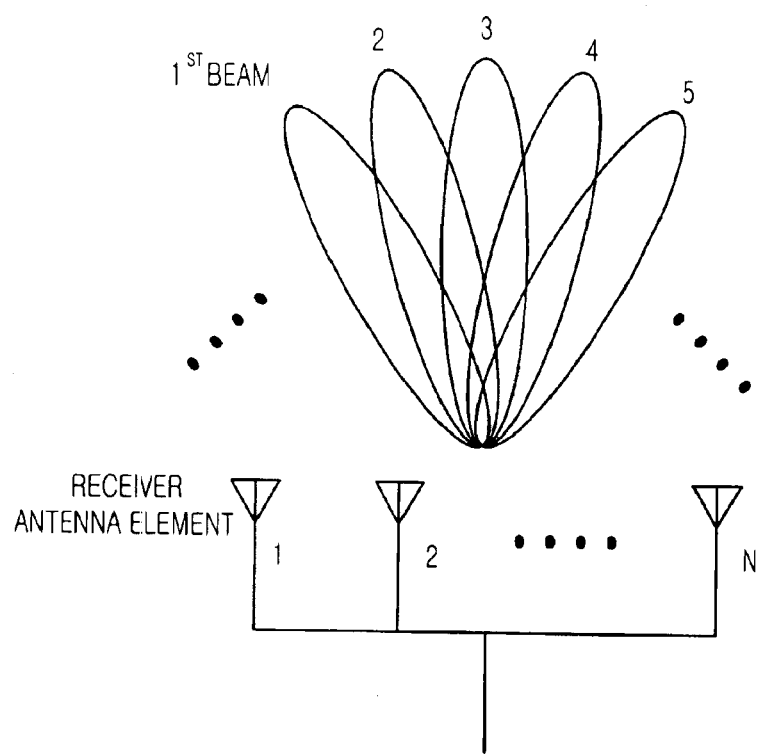
FIGS. 4A and 4B show a beam pattern applied to a receiver of digital television broadcasting signal in accordance with the preferred embodiment of the present invention.
Figure 4B:
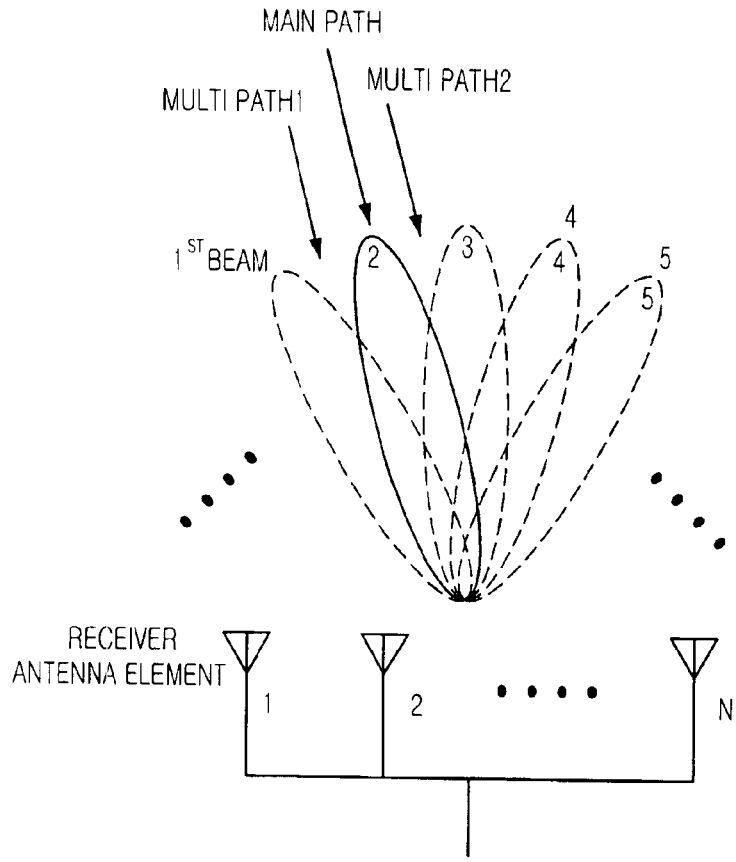

FIGS. 4A and 4B show a beam pattern applied to a receiver of digital television broadcasting signal in accordance with the preferred embodiment of the present invention.

Referring to FIG. 4A, a plurality of antenna elements forms beam patterns of receiver by converting parameters of antenna elements.

FIG. 4B shows a case that multipath signal is inputted to second beam pattern of the switched beam-former. Among beam patterns determined by coefficients of beamformer, second beam pattern of direction receiving main path is selected.

The characteristics of multipath are shown in below table 1.

TABLE 1

|  | strength of signal | delay time | azimuth angle (incidence angle) |
|---|---|---|---|
| mainpath | 1 | 0 μs | −22° |
| multipath 1 | 0.6 | 10 μs | −30° |
| multipath 2 | 0.8 | 20 μs | −17° |

Figure 5:
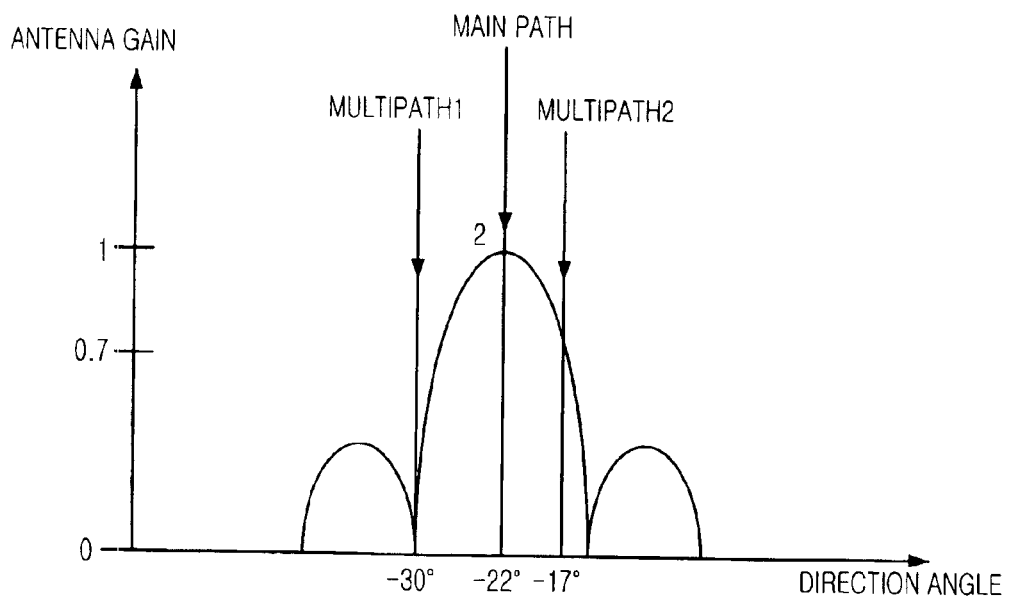
FIG. 5 is a graph for analyzing incidence of multipath signals used for a receiver of a digital television broadcasting signal in accordance with the present invention.

FIG. 5 is a graph for analyzing incidence of multipath signals used for a receiver of a digital television broadcasting signal in accordance with the present invention.

That is, FIG. 5 is a graph showing incidence of multipath signals according to antenna gain and incidence angle of second beam pattern in FIG. 4B.

Since a size of beam pattern is a gain of antenna when the gain of antenna according to incidence angle is as shown in FIG. 5, the signal of main path is incidence with antenna gain 1 and the signal of multipath 1 is incidence with antenna gain 0. And the antenna gain of the multipath 2 is 0.7.

Therefore, multipath 1 is eliminated by selecting second beam since the incidence angle −30° of array antenna of multipath and the gain of second beam is 0 at −30°.

Figure 6A:
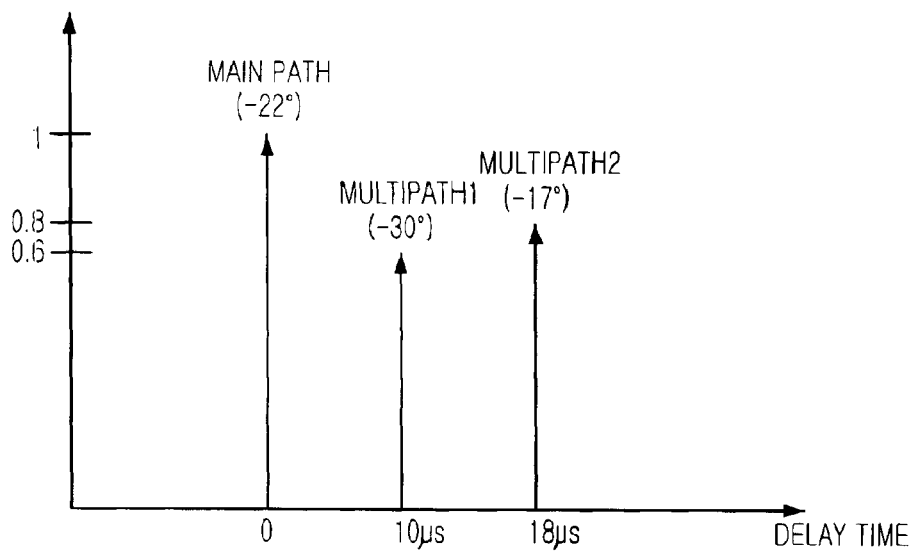
FIGS. 6A and 6B graphs showing a relation between strength and delay time according to paths.
Figure 6B:
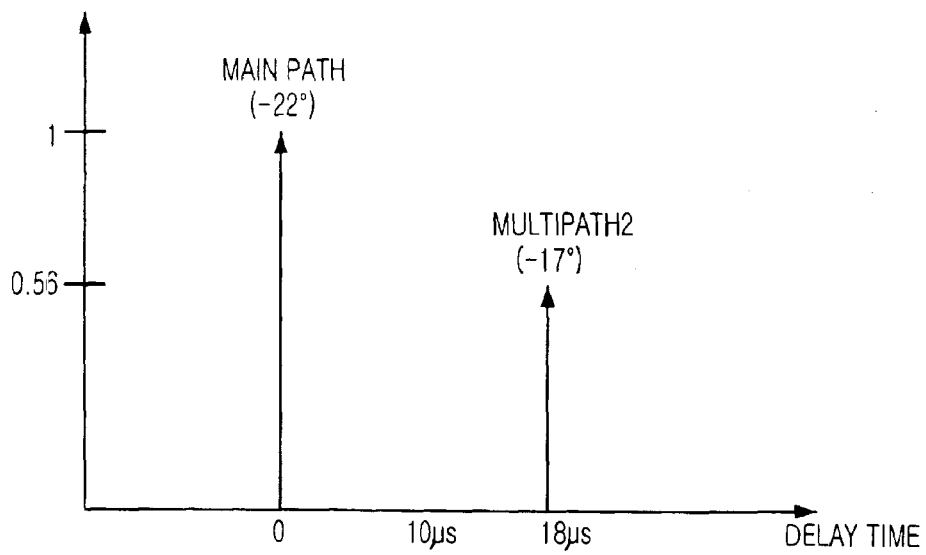

FIGS. 6A and 6B graphs showing a relation between strength and delay time according to paths.

FIG. 6A shows a case of receiving all-directions antenna. In this case, the strength of the signal of main path is 1, a standard delay time for incidence to antenna element is 0 μs and the incidence angel of antenna element is −22° since signal characteristics of multipath are passed. In case of multipath 1, the signal strength is 0.6, delay time is 10 μs and incidence angel is −30°. Also in case of multipath 2, the signal strength is 0.8, the delay time is 20 μs and the incidence angle is −17°.

However, there is no difference of strength of main path in case of selecting second beam in FIG. 6B but multipath 1 is eliminated since gain of antenna is 0 and the strength of signal is decreased 0.56 (0.8 (strength of signal)*0.7 (antenna gain)) since antenna gain of multipath 2 is 0.7.

Therefore, the output signal of second beam would have improved channel characteristics comparing to inputted signals to array antenna.

As mentioned above, the present invention effectively eliminates multipath based on space filtering by utilizing beam-forming method with an array antenna for improving receiving performance of digital television broadcasting with VSB.

The present invention forms multiple beams by using switched beam-forming method, selects one of beams, which is desired, and a signal received from the selected beam are inputted to a channel equalizer. By selecting the beam for receiving desired signal, the signals of multipath are effectively eliminated.

Therefore, the present invention can improve receiving performance of digital broadcasting signal in a channel with multipath without changing conventional standards of digital television broadcasting system.

Furthermore, the present invention mentioned above can improve receiving performance of VSB receiving method and can eliminate active multipath by using a beam-forming method of the array antenna.

Also, the present invention can improve a performance of receiving by using a switched beam forming.

While the present invention has been described with respect to certain preferred embodiments, it will be apparent to those skilled in the art that various changes and modifications may be made without departing from the scope of the invention as defined in the following claims.

What is claimed is:

1. An apparatus for receiving a signal of digital broadcasting service, comprising:
   an array antenna having a plurality of antenna elements, each antenna element for receiving signals from the digital broadcasting service;
   a demodulation means for demodulating the broadcast signals, each corresponding to each of antenna elements included in the array antenna;
   beam-forming means for receiving demodulated signals of the demodulation means to generate a predetermined number of beamformed signals based on different beam-forming weights in order to steer each of the predetermined number of beamformed signals to a predetermined direction according to the demodulated signals; and
   beam selection means for selecting one of the predetermined number of beamformed signals based on each predetermined direction of the predetermined number of beamformed signals, wherein the selected beamformed signal has the most desirable direction,
   wherein the demodulation means includes a plurality of demodulators, the number of demodulators equaling the number of antenna elements in the array antenna.

2. The apparatus as recited in claim 1, wherein the array antenna is a predetermined number of axis linear arrays, each having a predetermined number of antenna elements.

3. The apparatus as recited in claim 1, wherein the array antenna is at least one circular-type array antenna having a predetermined number of antenna elements.

4. The apparatus as recited in claim 1, wherein the array antenna is at least one planar array antenna having a predetermined number of antenna elements.

5. An apparatus for receiving a signal of digital broadcasting service, comprising:
   switched beamforming means for generating a beamformed signal in order to direct a predetermined number of angles by applying a beam-forming weight to a received signal from the digital broadcasting service and selectively receiving a signal of a desired direction;
   beam selection means for selectively receiving the signal of desired direction according to a predetermined number of beam forming signals, the beam selection means including an array antenna, and
   a demodulation means for demodulating the received signal,
   wherein the demodulation means includes a plurality of demodulators, the number of demodulators equaling a number of antenna elements in the array antenna.

6. The apparatus as recited in claim 5, wherein the switched beamforming means includes:
   beam-forming means for generating a predetermined number of beamformed signals by applying beam-forming weights in order to steer the beam to a predetermined direction to receive a digital broadcasting signal,
   wherein the predetermined number of beam forming signals are generated by the beam forming means.

7. The apparatus as recited in claim 7, wherein the beam-forming means outputs a signal by eliminating multipath receiving signals to a channel equalizer to improve equalization performance of the channel equalizer.

* * * * *